United States Patent
Yudanov

(10) Patent No.: US 12,111,789 B2
(45) Date of Patent: Oct. 8, 2024

(54) DISTRIBUTED GRAPHICS PROCESSOR UNIT ARCHITECTURE

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 305 days.

(21) Appl. No.: 16/855,879

(22) Filed: Apr. 22, 2020

(65) Prior Publication Data
US 2021/0334234 A1 Oct. 28, 2021

(51) Int. Cl.
| | |
|---|---|
| G06F 9/38 | (2018.01) |
| G06F 9/30 | (2018.01) |
| G06F 9/50 | (2006.01) |
| G06F 15/80 | (2006.01) |
| G06N 3/063 | (2023.01) |
| G06T 1/20 | (2006.01) |
| G06T 1/60 | (2006.01) |

(52) U.S. Cl.
CPC ...... *G06F 15/8092* (2013.01); *G06F 9/30043* (2013.01); *G06F 9/3877* (2013.01); *G06F 9/5083* (2013.01); *G06N 3/063* (2013.01); *G06T 1/20* (2013.01); *G06T 1/60* (2013.01)

(58) Field of Classification Search
CPC ............... G06F 9/3877; G06F 15/8092; G06F 9/30043; G06T 1/20
See application file for complete search history.

(56) References Cited

U.S. PATENT DOCUMENTS

| | | | |
|---|---|---|---|
| 8,860,741 B1* | 10/2014 | Juffa | G09G 5/363 |
| | | | 345/530 |
| 9,799,089 B1* | 10/2017 | Chen | G06T 15/80 |
| 2006/0176309 A1 | 8/2006 | Gadre et al. | |
| 2006/0267990 A1 | 11/2006 | Rogers et al. | |
| 2011/0087860 A1 | 4/2011 | Nickolls et al. | |
| 2011/0216078 A1 | 9/2011 | Blinzer | |
| 2014/0085318 A1 | 3/2014 | Nadar et al. | |
| 2016/0055667 A1* | 2/2016 | Goel | G06T 15/83 |
| | | | 345/522 |
| 2017/0243320 A1* | 8/2017 | Gruber | G06F 9/3851 |

(Continued)

OTHER PUBLICATIONS

International Search Report and Written Opinion, PCT/US2021/027328, mailed on Jul. 7, 2021.

*Primary Examiner* — Jacob Petranek
(74) *Attorney, Agent, or Firm* — Greenberg Traurig

(57) ABSTRACT

The present disclosure is directed to a distributed graphics processor unit (GPU) architecture that includes an array of processing nodes. Each processing node may include a GPU node that is coupled to its own fast memory unit and its own storage unit. The fast memory unit and storage unit may be integrated into a single unit or may be separately coupled to the GPU node. The processing node may have its fast memory unit coupled to both the GPU node and the storage node. The various architectures provide a GPU-based system that may be treated as a storage unit, such as solid state drive (SSD) that performs onboard processing to perform memory-oriented operations. In this respect, the system may be viewed as a "smart drive" for big-data near-storage processing.

31 Claims, 5 Drawing Sheets

(56) References Cited

U.S. PATENT DOCUMENTS

| | | | |
|---|---|---|---|
| 2018/0315160 A1* | 11/2018 | Ballow | G06F 9/3873 |
| 2019/0034093 A1* | 1/2019 | Jin | G06F 13/1631 |
| 2019/0057539 A1* | 2/2019 | Stanard | G06T 17/005 |
| 2021/0294646 A1* | 9/2021 | Hassaan | G06F 16/9024 |
| 2021/0303481 A1* | 9/2021 | Ray | G06F 13/1605 |

* cited by examiner

DISTRIBUTED GRAPHICS PROCESSOR UNIT ARCHITECTURE

FIELD OF THE TECHNOLOGY

At least some embodiments disclosed herein relate generally to a computer hardware architecture including an array of processing nodes. Embodiments are directed to using the hardware architecture to provide improved memory storage capabilities.

BACKGROUND

A graphics processor unit (GPU) is a specialized hardware component that uses memory management techniques to accelerate the processing image or video data. The data processed by a GPU is outputted to a display device for presentation to a user. In this respect, a GPU is a component in video processing system. For example, a GPU may be part of a video card or motherboard of a computing system. GPUs may form a single chip that couples to memory devices using a high-speed bus.

As GPUs are specialized devices for processing image or video data. GPUs may use bandwidth processors that are small in capacity. GPUs may interface with host memory to carry out image and video processing.

DETAILED DESCRIPTION

The present disclosure is directed to a distributed graphics processor unit (GPU) architecture that includes an array of processing nodes. Each processing node includes a GPU node that is coupled to its own fast memory unit and its own storage unit. Embodiments are also directed to a processing node having a unit that combines the fast memory and storage unit along with the GPU node. Additional embodiments are directed to a processing node having a fast memory unit coupled to a GPU node and a storage node. The various embodiments of a GPU architecture, described in further details below, provides a GPU-based system that may be treated as a storage unit that performs onboard processing to perform memory-oriented operations. In this respect, the system may be viewed as a "smart drive" for big-data near-storage processing. The system may function as a solid state drive (SSD) where a majority of the data is processed close to where it is stored while being optimized to reduce in/out SSD data traffic. A processing node may include a vector-scalar processor die. The array of these vector-scalar processor die may be connected by coherent fabric. Each vector-scalar processor die may be directly coupled to a fast memory unit (e.g., random access memory (RAM), dynamic RAM (DRAM)) and may also be directly coupled to a storage unit (e.g., non-volatile RAM, NAND Flash device, Cross Point memory) by a local interconnect. This may provide near-storage, low-power, in-place processing at high aggregate bandwidth and multi-teraflop throughput across the whole system. The following discussion refers to the FIGS. to illustrate various embodiments of a distributed GPU architecture.

Figure 1:
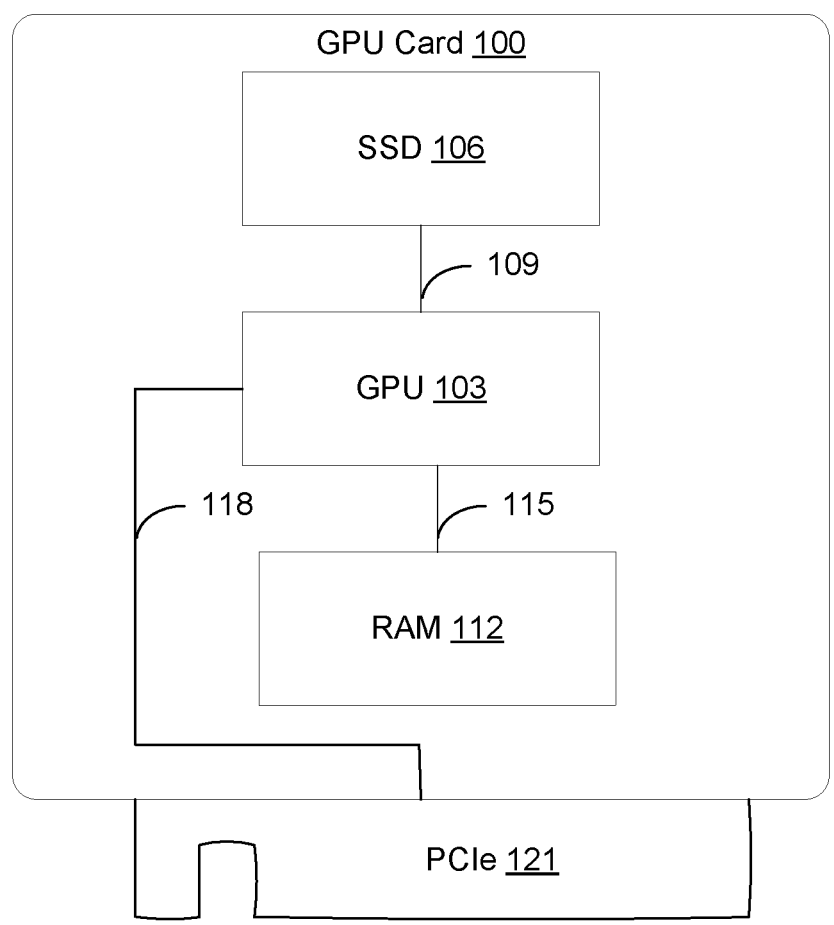
FIG. 1 depicts an example of a graphics processor unit (GPU) implemented as a GPU card in a non-distributed architecture.

To better illustrate a distributed graphics processor unit (GPU) architecture of the present disclosure, FIG. 1 depicts a non-distributed GPU architecture. FIG. 1 shows a GPU card 100. The GPU card may be inserted into an interconnect slot on a circuit board such as, for example, a motherboard. Although a GPU card is shown, the components of the GPU card may be embedded or otherwise integrated within a system without the use of a card.

The GPU card 100 includes a GPU 103. The GPU 103 is coupled to a solid state drive (SSD) 106 by way of a local bus 109. In addition, the GPU 103 is coupled to a random access memory (RAM) 112 by another local bus 115. The GPU 103 further couples to an external interface 121 via a local bus 118. The external interface 121 may be a peripheral component interconnect express (PCIe) interface.

The GPU 103 may include a plurality of compute units (e.g., 64 compute units) that work together to form one large GPU. The compute units of the GPU may be fabricated on a single die. The GPU 103 may be coupled to the SSD 106, where the SSD provides storage for the entire GPU 103. For example, the SSD 106 may form a 2 Terabyte drive and the local bus 109 provides 8 Gigabytes per second of data transfer for read operations by the GPU 103 and 6 Gigabyte per second of data transfer for write operations by the GPU. In addition, the GPU 103 may be coupled to RAM 112 that provides 16 Gigabytes of memory. The RAM 112 may be graphics double data rate (GDDR) memory, a high bandwidth memory (HBM) device, hybrid memory cube (HMC) device, or the like. The local bus coupling the GPU 103 and RAM 112 may be 2048 bits wide and provide about 483 Gigabytes per second of data transfer.

The GPU card 100 may include an external interface 121 such, for example, a PCIe interface, to couple the GPU 103 with other external system components. External system components may include, for example, host memory, a host processor, and other components on a motherboard or computing system. The GPU card 100 provides a SSD-GPU solution for high-performance GPU-centric applications such as, for example, providing graphics for gaming, medical imaging, entertainment, Hi-Definition (HD) 8K video editing, 3D CAD modeling sectors, and other graphics-oriented applications, including ones requiring large space for storage.

Figure 2:
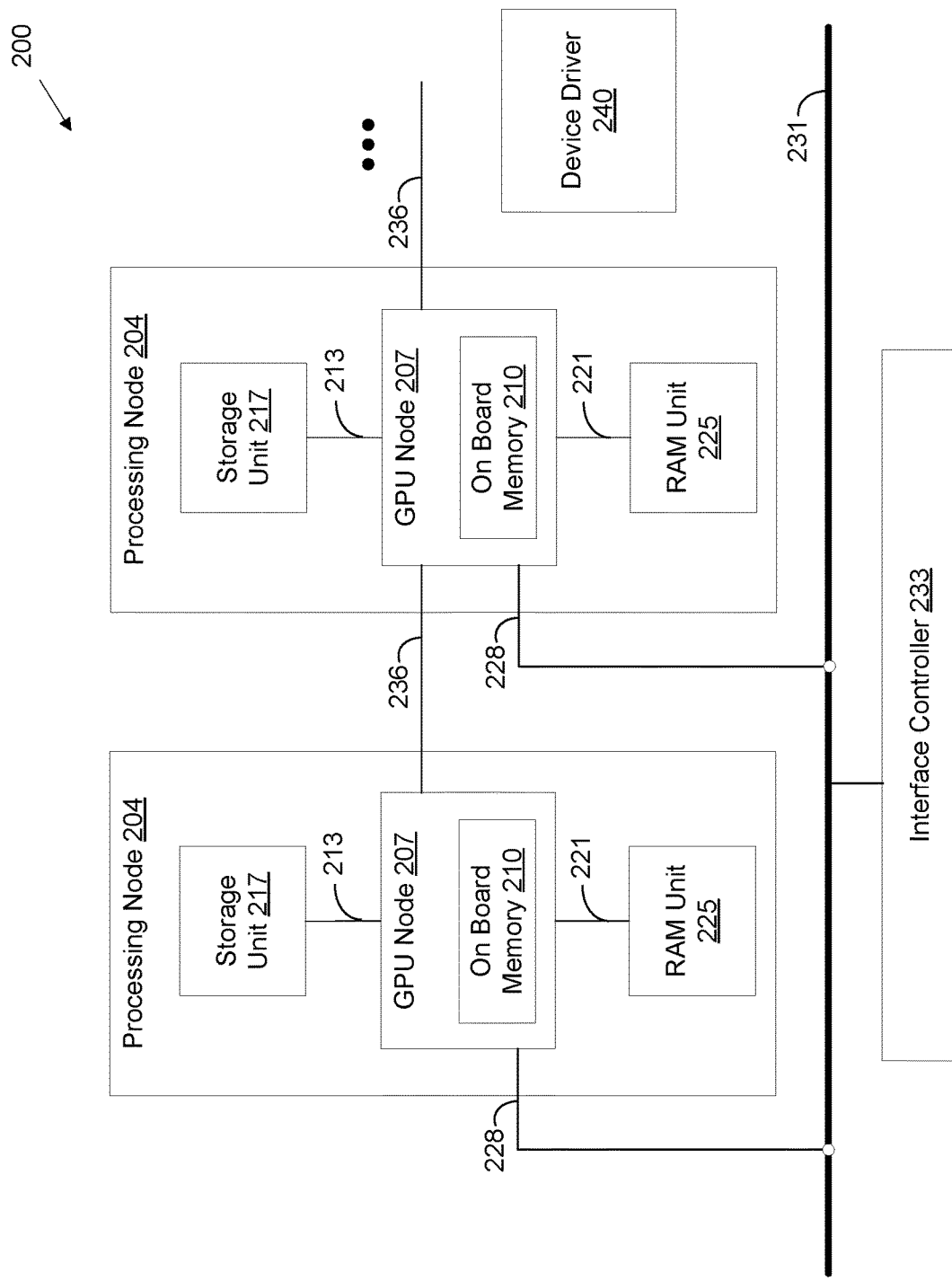
FIG. 2 depicts an example of a distributed GPU drive according to embodiments of the present disclosure.

FIG. 2. depicts an example of a distributed graphics processor unit drive according to various embodiments of the present disclosure. FIG. 2 shows an embodiment of a distributed GPU drive 200. The distributed GPU drive 200 adopts an architecture that distributes a GPU, such as, for example, the GPU 103 of FIG. 1, across an array of processing nodes 204. This allows the distributed GPU drive 200 to provide a more data storage-centric drive that handles data beyond video and image data, according to embodiments. In other words, the distributed GPU drive 200 provides applications for improved storage and near-storage processing.

The distributed GPU drive 200 may be embedded in a card such as, for example, a PCIe card, or any other card that plugs into a slot of a circuit board of a host system. The distributed GPU drive 200 may be embedded directly on a circuit board or motherboard or otherwise integrated into other computing devices. In some embodiments, the distributed GPU drive 200 is implemented as a system on a chip (SOC).

The distributed GPU drive 200 includes an array of processing nodes 204. In some embodiments, each processing node 204 is functionally identical to one another. Each processing node 204 may include a GPU node 207. A GPU node 207 may be a single die and may contain a single GPU compute unit. The GPU node 207 may comprise a core that is configured for scalar processing. Serving as a scalar processor, the GPU node 207 operates similar to a central processing unit (CPU) that processes instructions according to a deep pipeline architecture. For example, the GPU node 207 process data according to various pipeline stages such as, for example, fetching an instruction, decoding the instruction, executing the instruction to generate an output, accessing memory, writing the output to memory, or other pipeline stages. In some embodiments, the GPU node 207 may be superscalar such that pipeline stages may be implemented in a different order. For example, GPU node 207 that is superscalar may fetch multiple instructions at a time and execute each instruction independent of one another so as it perform parallel pipeline stage operations and exploiting instruction-level parallelism. The GPU node 207 may comprise multiple scalar cores of the same or different architectures, hence creating a heterogenous multi-core processor.

In some embodiments, the GPU node 207 may comprise a core that is configured for vector processing. Serving as a vector processor, the GPU node 207 operates similar to a single instruction, multiple data (SIMD) core or a Very Long Instruction Word (VLIW) core. For example, the GPU node 207 may include a plurality of elements that operate on multiple data points of input data simultaneously. For example, if the data being processed is image data comprising several pixels, rather than operating on each pixel in a serial manner, a GPU node 207 with vector processing capabilities may load multiple pixels and operate on them simultaneously.

According to embodiments, the GPU node 207 comprises a vector-scalar processor (VSP). For example, the GPU node 207 is configured to perform vector processing and/or scalar processing. The GPU node 207 may comprise a vector processing core and a scalar processing core. In some embodiments, the vector processing core includes a vector arithmetic-logic unit (ALU), which is a component that performs arithmetic and logic operations on input data. The vector ALU may be reconfigured to function as one or more scalar components or into a combination of scalar processing components and smaller vector processing components. For example, the vector ALU comprises registers that operate on inputs up to 256 elements at a time, the vector ALU may be reconfigured to include six smaller vector ALUs that are 32 elements wide and sixty four scalar ALUs that are 1 element wide, the element being a number of digital units to be processed simultaneously (e.g. integer of floating point numbers with a certain bit width). In other words, a vector ALU can be reconfigured and broken-down into some scalar ALUs and some shorter vector ALUs. To reconfigure the GPU node 207, a separate program counter may be used along with an instruction decode/dispatch block for each ALU (either vector or scalar). The instruction cache and fetch and reorder block of the GPU node 207 architecture may remain unchanged upon reconfiguring the GPU node 207.

A GPU node 207 may include onboard memory 210. The onboard memory 210 may be fast memory that is volatile for quick read and write operations. Volatile components may be those that do not retain data values upon loss of power. The onboard memory 210 may be RAM, static RAM (SRAM), DRAM. The onboard memory 210 may be have a high bandwidth but low capacity to allow for quick, but small data access. For example, the onboard memory 210 may be high bandwidth memory (HBM), which is a high-performance RAM device. The onboard memory 210 may be fabricated on the same die as the GPU node 207 or it can be bonded to its die via Through Silicon Via (TSV) technology or the like.

The processing node 204 may include a local bus 213 that couples the GPU node 207 directly to a storage unit 217. The storage unit 217 may include nonvolatile memory in a form of a silicon die that is directly interfaced with GPU. Nonvolatile memory may include devices that retain data upon a loss of power. The storage unit may be a storage drive such as, for example, a solid state drive (SSD). The storage unit 217 may comprise solid-state memory such as, for example, Flash memory, NOR Flash (e.g., Flash memory in a NOR configuration) or NAND Flash (e.g., Flash memory in a NAND configuration). The storage unit 217 may include resistive RAM (ReRAM), cross-point memory, cross-bar 3D memory, or any other memory device that provides data storage. While there are several GPU nodes 207 in the distributed GPU drive 200, a single GPU node 207 may be directly coupled to a corresponding storage unit 217. In some embodiments, the storage unit 217 includes 2 Terabyte of solid state memory. The local bus 213 may provide a data transfer rate of 4 Gigabytes per second for read and write operations. The local bus 213 may comply with the NV-DDR3 specification or the like. The local bus 213 may include eight 8-bit wide buses to read and write data to/from the storage unit 217. Assuming that there are sixty-four GPU nodes 207 within the distributed GPU drive 200, where each GPU nodes 207 reads/writes data to a respective storage unit 217 over a respective local bus 213 at a rate of 4 Gigabytes per second, then the overall distributed GPU drive 200 has a global peak data transfer rate of 256 Gigabytes per second across all GPU nodes 207. This is substantially higher than an architecture that is not distributed such as, for example, the architecture described in FIG. 1. In addition, assuming that each storage unit 217 is 2 Terabytes in size, the overall distributed GPU drive 200 has a total storage of 128 Terabytes. In some embodiments, the RAM unit 225 and the storage unit 217 may be combined in a single unit. In this case data can be buffered in the RAM part of the combined unit and can be directly written to or read from the storage part of combined unit.

The processing node 204 may include a local bus 221 that couples the GPU node 207 directly to a RAM unit 225. The RAM unit 225 may include volatile memory such as, for example, RAM, SRAM, or DRAM. While there are several GPU nodes 207 in the distributed GPU drive 200, a single GPU node 207 may be directly coupled to a corresponding RAM unit 225. In some embodiments, the RAM unit 225 includes 4 Gigabytes of fast memory. The local bus 221 may provide a data transfer rate of 32 Gigabytes per second for read and write operations. The local bus 213 may comply at least partly with the DDR4, DDR5, HBM, or similar specification. The local bus 221 may include a 128-bit wide bus to read and write data to/from the RAM unit 225. Assuming that there are sixty-four GPU nodes 207 within the distributed GPU drive 200, where each GPU nodes 207 reads/writes data to a respective RAM unit 225 over a respective local bus 221 at a rate of 32 Gigabytes per second, then the overall distributed GPU drive 200 has a global peak data transfer rate of 2 Terabytes per second across all GPU nodes 207. This is substantially higher than an architecture that is not distributed such as, for example, the architecture described in FIG. 1.

The distributed GPU drive 200 may adopt a lane topology with respect to the GPU nodes 207, which is shown in FIG. 2. For example, the distributed GPU drive 200 may include buses 228 that couple each GPU node 207 to a common bus 231. In this respect, each GPU node 207 may be arranged in parallel with respect to the common bus 231. In some embodiments, a data input may be processed in parallel in a set of GPU nodes operating in parallel as portions of the data input is provided via one or more buses 228. The common bus 231 may couple to an interface controller 233.

The interface controller 233 may be a PCIe controller, Gen-Z controller, a Cache Coherent Interconnect (CCIX) controller or another interface controller for coupling to systems external to the distributed GPU drive 200, for example a Coherent Accelerator (CXL), or Coherent Accelerator Processor Interface (CAPI). The interface controller 223 may provide a link to external systems (e.g., a host system that couples to the distributed GPU drive 200). The interface controller 233 allows the components of the distributed GPU drive 200 and components of a host system to exchange data and/or control signals between each other. The interface controller 233 may comprise input/output ports to couple to a host system residing outside the distributed GPU drive 200. The interface controller 233 may be an Input/Output (IO) bus such as, for example, a DDR5 bus or PCIe bus or CXL bus. In this respect, a host system may read or write data to the RAM unit 225 and/or storage unit 217. In addition, host systems may transmit control signals to one or more GPU nodes 207.

A host system, or any other external system, may include a host processor with a Printed Circuit Board (PCB) motherboard, wherein the distributed GPU drive 200 is connected to host processor over a bus such as DDR4, DDR5 or PCIe or alike. The host system may execute an operating system, applications, libraries, scripts, or programming languages. The host system may include one or more server racks or computers or other arrangements. A server may be a single installation or may be distributed among many different geographical locations. The host system may include a plurality of computing devices that together may comprise a hosted computing resource, a grid computing resource and/or any other distributed computing arrangement. In some cases, the host system may correspond to an elastic computing resource where the allotted capacity of processing, network, storage, or other computing-related resources may vary over time. The host system may implement one or more virtual machines that use the resources of a computing system. Various software components may be executed on one or more virtual machines.

In addition, the distributed GPU drive 200 includes buses 236 that couple GPU nodes 207 in series. In this respect, a set of GPU nodes 207 connected or daisy-chained in series may exchange data in a token-ring like manner by receiving data from a previous GPU node 207, processing the data and transferring the processed data to a subsequent GPU node 207. The bus 236 may have a full duplex protocol by which data can flow in both directions. Thus, the most distant GPU nodes 207 can have its data meet in the middle and processed there. Besides lane-like connections, GPU nodes 207 may be organized in a ring-like topology where a ring is formed by locating GPU nodes 207 on both sides of PCB, thus providing a fair data exchange to all nodes. Several rings may be formed in parallel in both vertical and horizontal direction, thus creating a mesh of networked nodes. Besides, nodes located directly on opposite sides of PCB can have additional PCB-through buses for faster data exchange. As a result, the distributed GPU drive may have high communication bandwidth among the nodes. Same may apply at least partly to bus 231.

The buses 228, 231, 236 may be implemented using coherent fabric. The coherent fabric may provide for data exchange between the GPU nodes 207 and for synchronization of vector and scalar operations. As shown in FIG. 2, the coherent fabric may couple to an interface controller 233. Thus, coherent fabric couples to each processing node 204 to provide the exchange of data between each processing node 204 to synchronize the execution of operations performed by the distributed GPU drive 200. The coherent fabric may be implemented using a variety of types of technologies including, for example, RapidIO, CCIX, CXL, etc.

The distributed GPU drive 200 may include a device driver 240. A device driver may be middleware that allows host systems to interface with the distributed GPU drive 200. The device driver 240 may be stored in a nonvolatile memory component of the distributed GPU drive 200. The device driver 240 may be copied or otherwise transferred into a host system so that the host system may execute the device driver 240 to interface with the distributed GPU drive 200. The device driver may include code to control the array of processing nodes 204 to perform an operation by distributing an execution of the operation across one or more of the processing nodes 204. The device driver 240 may be loaded into a host system as a plug and play (PnP) device. Here, a host system may discover the distributed GPU drive 200 via a common protocol, such as for instance Serial ATA (SATA), when the distributed GPU drive 200 is coupled to the host system. Upon discovery, the device driver 240 may be automatically loaded or otherwise installed in the host system.

When a host system (e.g., host CPU) uses the distributed GPU drive 200 it may transmit a message to the distributed GPU drive 200, where the message includes an operation (e.g., an instruction to carry out a particular task). The message may include parameters and/or data. The message may be transmitted by the device driver 240 after it is transferred to the host system to the coherent fabric of the distributed GPU drive 200. In some embodiments, the interface controller 233 of the distributed GPU drive 200 receives a message. In other embodiments, the coherent fabric of the distributed GPU drive 200 receives the message without an interface controller 233.

The message that references the operation may be a broadcast message, a multicast message, a node-addressed message, or a point-to-point message. For example, the message may or may not specify a target processing node 204 to handle the message. If the message is a broadcast message that does not specify a particular processing node 204, the distributed GPU drive 200 may perform a global synchronization to handle the message using one or more processing nodes 204. For example, the distributed GPU drive 200 may use memory fences or barriers to handle a broadcast message.

Each GPU node 207 may implement an operating system (OS) that interprets a local library of primitives. In addition, each GPU node 207 may include onboard memory 210 to store task and thread contexts when switching between tasks and threads. When scheduling a task or thread to be executed, the available size of each onboard memory 210 may be computed and accounted for when designating which GPU nodes 207 will handle a particular message. A GPU node 207 may include a register for storing a status of sequencer/controller. This provides orchestration of tasks and control over the coherent fabric and messaging. The status of sequencer/controller can be set in any GPU node 207 at boot time or migrated post-boot at any time. A driver or operating system that transmits a message may first interface with the distributed GPU drive 200 to determine status of sequencer/controller of each GPU node 207 prior to transmitting a message.

Figure 3:
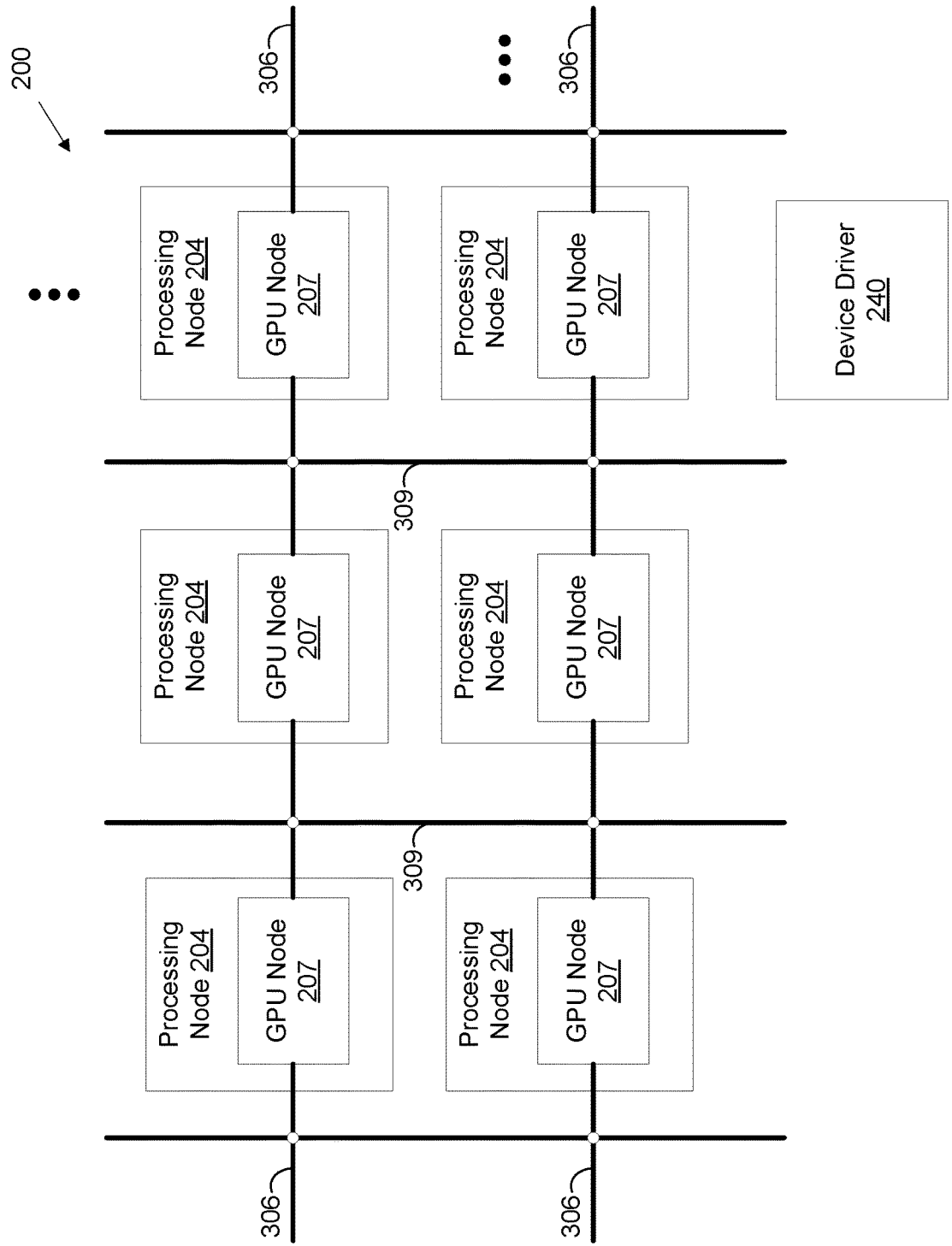
FIG. 3 depicts another example of a distributed GPU drive according to embodiments of the present disclosure.

FIG. 3 depicts another example of a distributed graphics processor unit drive according to various embodiments of the present disclosure. FIG. 3 depicts an example of organizing GPU nodes 207 in a mesh topology. For example, the GPU nodes 207 are arranged in an array where they are connected both in serial using a first bus 306. Each of the first buses 306 are connected using a second bus 309. The network of buses 306 and 309 may be implemented using coherent fabric. In some embodiments, the coherent fabric couples directly with external components such as, for example, a CPU on a host motherboard. The mesh topology described above may or may not include an interface controller. For example, the distributed GPU drive 200 using a mesh topology of coherent fabric may be embedded directly on a circuit board and couple to other components on the circuit board such as, for example, a host processor. The mesh topology could wrap around the circuit board, hence forming a spheroid, or ellipsoid, or torus or other volumetric topology in which a fair distance among each node is given. Besides, GPU nodes 207 located directly on opposite sides of PCB can have additional PCB-through buses for faster data exchange. As a result, the distributed GPU drive may have high communication bandwidth among the GPU nodes 207.

In some embodiments, the capacity of the storage unit 217 is exposed and directly available to host systems via the coherent fabric. This provides a view of the storage resources of the distributed GPU drive 200 to host systems.

Next is a general description of the functionality of a distributed GPU drive 200 whether it uses a lane connectivity topology (e.g., FIG. 2), a mesh connectivity topology (e.g., FIG. 3), or any other topology for connecting an array of GPU nodes 207. A distributed GPU drive 200 provides an improved solution for storing/accessing data and locally processing the data near the storage. The computations performed by the GPU nodes 207 may be orchestrated in a distributed way via coherent fabric. Each processing node 204 may include a set of user-defined or pre-compiled primitive programs (e.g., kernels, tasks) that perform certain compute operations with the data stored on that processing node 204 as well as the data coming from other processing nodes 204 via coherent fabric. Each processing node 204 may store the same set or library of primitives such that they are functionality equivalent to one another.

According to embodiments, the GPU node 204 controls data movement between the storage unit 217 and the RAM unit 225. The GPU node 207 may also perform operations on the data as data transferred between these components. For example, the GPU node 207 may use the RAM unit 225 as a byte-addressable scratchpad memory for caching data that is block-addressable by the storage unit 217. For example, because the RAM unit 225 has fast access times compared to the storage unit 217, copies of data may be cached in the RAM unit 225. The data may be byte addressable when communicating with the RAM unit 225. The data stored in the RAM unit 225 may reference a block stored in the storage unit 217. In this respect, the RAM unit 225 may play a role of a page cache, where the entire storage space of storage unit 217 is page-addressable, and GPU nodes 207 operate on and process pages cached in the RAM unit 225. The RAM unit 225 may be entirely combined with the storage unit 217 so to expedite fast and direct data exchange between storage and memory without going though the GPU unit 207, but commanded or controlled by the GPU unit 207.

In addition, the GPU node 207 may buffer data by loading the data into the RAM unit 225 and to store the buffered data in the storage unit 217. For example, when performing a store operation, the GPU node 207 uses the RAM unit 225 as a buffer to ultimately store the data in the storage unit 217.

In some embodiments, the GPU node 207 is configured to include a controller for the storage unit 217 and a controller for the RAM unit 225. For example, the GPU node 207 may include a SSD controller and a RAM controller. In this respect the GPU node 207 may include a unified input-output memory unit (IOMMU) for providing memory management between the storage unit 217 and the RAM unit 225. In this respect, the RAM unit 225 may have direct memory access to the storage unit 217 via the GPU node 207.

Some embodiments are directed to operating in low power. The consumption of power by the GPU node 207 may be received by matching the data access speed of the storage unit 217 with the RAM unit 225 for a given processing node 204.

Figure 4:
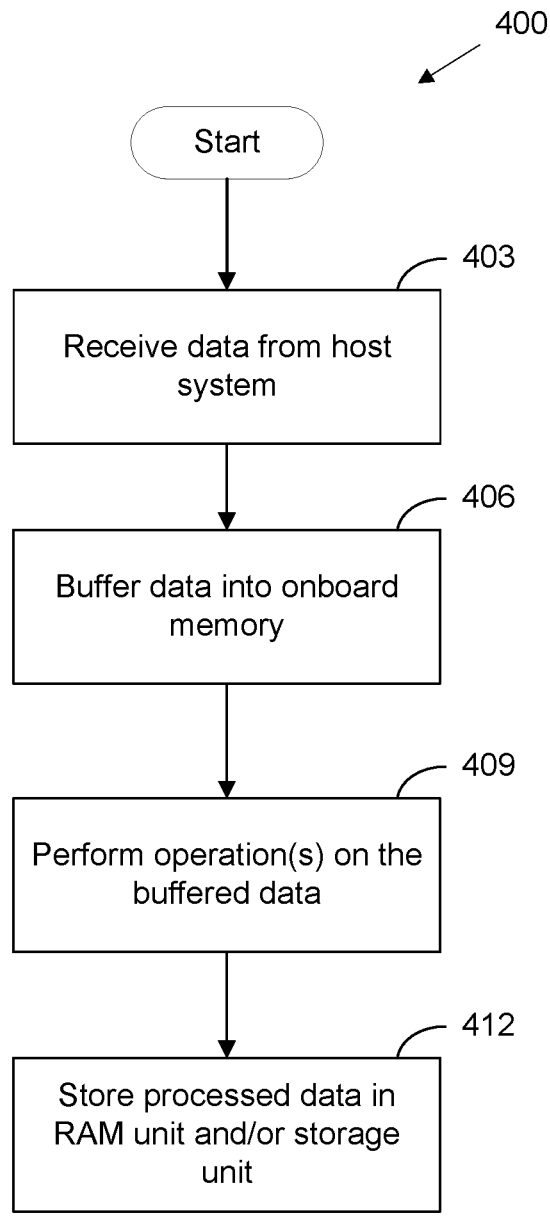
FIG. 4 is a flowchart providing an example of operations performed by a distributed GPU drive according to embodiments of the present disclosure.

FIG. 4 is a flowchart providing an example of operations performed by the distributed GPU drive 200. The boxes in the flowchart may represent microcode, machine code, firmware, or other software executable by one or more components of the distributed GPU drive 200. The boxes of the flowchart may alternatively represent steps in a method 400. The method may be performed by the distributed GPU drive 200.

At 403, the distributed GPU drive 200 receives data from a host system. Data may be received through coherent fabric that directly couples a host system to the distributed GPU drive 200. Data may be received via an interface controller 233 that interfaces the distributed GPU drive 200 with the host system. The host system may execute a device driver 240 that allows an operating system of the host system to communicate with components of the distributed GPU drive 200.

The distributed GPU drive 200 may identify one or more processing nodes 204 to store the data in respective RAM units 225 or storage units 217. The data received from the host system may be stored as data blocks within one or more memory component of the distributed GPU drive 200. In some embodiments, the data may comprise a distributed dataset where different portions of the data are distributed across various processing nodes 204. Examples of frameworks that use distributed datasets are Spark, Hadoop, and Hadoop Distributed File System (HDFS).

At item 406, the distributed GPU drive 200 may buffer at least some of the received data into onboard memory 210 of one or more processing nodes 204. For example, the distributed GPU drive 200 may receive a message from the host system to process data stored in the distributed GPU drive 200. In response, the distributed GPU drive 200 may identify the data that is subject to being processed and then buffer the identified data into onboard memory 210.

At item 409, the distributed GPU drive 200 may perform one or more operations on the buffered data. For example, one or more GPU nodes 207 may be configured to implement vector processing to perform operations on data residing respective onboard memory 210. Moreover, multiple GPU nodes 207 may process buffered data in parallel, where the buffered data resides the onboard memories 210 of respective GPU nodes 207. Instructions relating to how the data is to be processed or operated on may be specified in a message received from the host system.

At item 412, the distributed GPU drive 200 may store the processed data in RAM unit(s) 225 or storage unit(s) 217. For example, as each GPU node processes the respective buffered data, the output may be stored in a respective RAM unit 225 (for quick access) or storage unit 217 (for long term storage). Additional messages may be received from the host system to access or transfer the processed data to the host system.

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, synchronization among processes, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor in a computing system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The following provides additional embodiments of configuring the distributed GPU drive 200 whether it uses a lane connectivity topology (e.g., FIG. 2), a mesh connectivity topology (e.g., FIG. 3), or any other topology for connecting an array of GPU nodes 207. Specifically, the following provides various memory applications such as, for example, configuring the distributed GPU drive 200 for performing distributed hierarchical caches, performing in-drive database operations using parallel vector processing, implementing an accelerated file system, providing user code tunneling to the device block layer, implementing byte-addressability with block computation, providing in-drive parallel frameworks, implementing application-level functionality as a workstation, and implementing artificial intelligence algorithms or executing high-definition graphics.

In some embodiments, the distributed GPU drive 200 is configured for performing distributed hierarchical caches. The onboard memory 210 may serve as a first cache level, the RAM unit 225 may serve as a second cache level, and the storage unit 217 may serve as a third cache level. Together, the onboard memory 210, RAM unit 225, and storage unit 217 form a hierarchical cache memory structure for each processing node 204.

In the field of data storage, a data block refers to substantive data that may be relatively large in size. Index data may be associated with a corresponding data block. Index data provides a latency-sensitive, search assisting structure to quickly reference a data block without directly accessing or searching for the data block. Such index data may include tags, hash values, semantic structures, keys, and other data structures. A processing node 204 may be configured to load index data of a data block in the RAM unit 225 while storing the data block in the storage unit 217. To search for a target data block, the processing node may search for index data in the RAM unit 225. The index data may indicate whether the storage unit 217 of the processing node contains the target data block and if so, the index data may specify the location in the storage unit 217 of the target data block.

As another example, a data block may be stored in a storage unit 217. If that data block is accessed or frequently accessed, a copy of the datablock may be loaded into the RAM unit 225. Index data for the data block may be stored in onboard memory 210. A GPU node 207 can quickly scan the onboard memory 210 and read or access the data from the storage unit 217 or from the RAM unit 225, depending on whether the data block was cached in the RAM unit 225. Because the distributed GPU drive 200 contains multiple processing nodes, scanning for index data may be performed quickly and in parallel by multiple GPU nodes 207 to identify the location of target data blocks within one or more storage units 217.

The GPU node 207 may process data blocks that have been accessed from the storage unit 217 or RAM unit 225. In additional, one or more GPU node 207 may process the data block retrieved from a particular processing node 204. In some embodiments, the distributed GPU drive 200 is configured for performing in-drive database operations using parallel vector processing. Here, a data block may be accessed using index data that is scanned by one or more GPU nodes 207. The data block may be identified as part of a message sent to the distributed GPU drive 200 for accessing data and performing in-drive operations. Such in-drive operations may include performing one or more searches, insertions, or read-modify-writes with records located across multiple storage units 217. For example, a message may be received by distributed GPU drive 200. The message may include an instruction to perform a database operation and may include input parameters to perform the operation. The GPU nodes 207 may scan index data to identify one or more data blocks stored in storage units 217 and then perform the data base operation specified in the message.

In some embodiments, the distributed GPU drive 200 is configured for implementing an accelerated file system. For example, a set of GPU nodes 207 that perform vector operations may be leveraged to provide an accelerated file system. For example, a RAM unit 225 may perform page caching where unused memory of a RAM unit 225 may be loaded with pages from the storage unit 217. A page, in the context of memory management refers to a memory unit made up of a contiguous block of memory. A page may be a predetermined size forming the smallest unit of memory handled by the storage unit 217.

According to some embodiments, because each storage unit 217 is coupled with a GPU node 207 and the onboard memory of a GPU node 207, file operations may be accelerated by accessing files. For example, an external system (e.g., the host processor OS) may use the vector cores of one or more GPU nodes 207 to perform operations on data blocks stored in the distributed GPU drive 200. To illustrate this example, an mmap( ) function call may be initiated at a host OS and broadcast to all GPU nodes 207 of the distributed GPU drive 200 to perform the mmap function. An mmap( ) function (i.e., memory map function) is a function that seeks to map a specified number of bytes of a file according to an offset from the file. For the pages modified in response to access calls performed on a mapped data after the mmap function, the modifications may be performed within the distributed GPU drive 200 using additional operations transmitted by a host OS to the distributed GPU drive 200. In this respect, the host OS may delegate memory management operation to the distributed GPU drive 200 using messaging and direct access. In addition, other operations may be initiated at the host OS, where such operations operate on data blocks stored in the distributed GPU drive 200. One example of an operation is a memory allocation (malloc) operation. Malloc may be used to allocate a block of memory in a larger area of memory. Malloc may access a block of memory using a pointer that is returned by malloc. Another operation is a memory free function. A memory free function deallocates a block of memory that is referenced by a pointer. Other operations initiated at the host system may include any operations that involve dynamic memory allocation.

In some embodiments, the distributed GPU drive 200 is configured for providing user code tunneling to the device block layer. In this embodiment, each storage unit 217 is configured to provide access to a user while bypassing the host operating system of a host system that couples to the distributed GPU drive 200. A user may develop code that directly access, reads, writes, or otherwise operates on data stored in distributed GPU drive 200 without relying on a host OS to generate and transmit instructions to the distributed GPU drive 200, and hence avoiding its overhead. Here, a host OS may establish a connection between a user application and the distributed GPU drive 200. For example, the host OS may handle any mapping necessary to establish the connection is correct. The host OS may relay messages requested by a user to be forwarded to the distributed GPU drive 200. Moreover, user code may span kernel or implement other microservices compiled to drive microcode programs that are targeted to execute on cached blocks or pages at each GPU node 207 coupled to respective storage units 217 and RAM units 225. The host OS may perform the compilation of the user code using a compiler bundled with a device driver 240 to allow a user to directly access storage unit data via tunneling. Once the host OS establishes a tunnel, the host OS is bypassed as the user code causes messages to be sent directly to the distributed GPU drive 200 via the tunnel.

In some embodiments, the distributed GPU drive 200 is configured for implementing byte-addressability with block computation. For example, a block of data may be buffered to onboard memory 210. A block of data may be buffered from the RAM unit 225 or from the storage unit 217. The GPU node 207 is configured to byte-address the blocks buffered in the onboard memory 210. Byte addressing allows a local GPU node 207 to access individual bytes of the buffered blocks rather than larger memory units such as the blocks. This allows the GPU node 207 to perform computations on several blocks within a single clock cycle by accessing bytes of blocks buffered in the onboard memory.

Byte addressability for blocks of data stored in onboard memory 210 may also provide improved user code tunneling. As mentioned above, instructions may be generated by user code to operate on data via an established tunnel between a user application on a host system and the processing nodes 204. The GPU nodes 207 may translate instructions to allow the GPU nodes 207 to process data stored in the processing node 204. For example, a GPU node 207 may translate schema referenced in an instruction to describe how data structures, pages, and bytes are laid out in a block of data. Pages may be cached in the RAM unit 225 and/or onboard memory 210. The GPU node 207 may process cached pages using byte addressing in accordance with instructions and schemas received over a tunnel.

In some embodiments, the distributed GPU drive 200 is configured for providing in-drive parallel processing. There are frameworks such for cluster computing and parallel processing such as, for example, Apache Spark, that provides large-scale data analytics using parallel processing. Big data may be stored as a distributed dataset across a plurality of storage units 217. A set of GPU nodes 207 are configured to operate as a cluster of vector processors to operate on data stored in corresponding storage units 217. Each GPU node 207 within the cluster may include an executer (e.g., a Spark executer) that executes instructions received from a host system or user-tunneled code loaded in the onboard memory 210.

In some embodiments, the distributed GPU drive 200 is configured for implementing application-level functionality as a workstation. For example, a cluster of GPU nodes 207 may execute a distributed operating system that supports user-level applications that are data-storage oriented. The data may be stored in corresponding storage units 217 while the user-level application is executed by a cluster of GPU nodes 207. Examples of user-level applications include, for example, computer aided design (CAD) applications, modeling software, simulation software, video editing software, spreadsheet applications, Matlab, or other software applications that interface with users. User-level applications may perform various data operations such as, for example, calculate statistics, perform mathematical operations, perform data transformations, perform data analytics, etc. In addition, the cluster of GPU nodes 207 that execute a user-level application may generate video graphics that is transmitted to a host system for display to a user. In this respect, a graphical user interface rendered on a display allows the user to transmit instructions and receive output from the distributed GPU drive 200.

In some embodiments, the distributed GPU drive 200 is configured for implementing artificial intelligence algorithms. For example, a cluster of GPU nodes 207 may be configured to execute a neural network. Different sets of processing nodes 204 implement different layers within a neural network. For example, a first set of processing nodes 204 may implement a convolution layer. A second set of processing nodes 204 may implement a pooling layer in a neural network. A third set of processing nodes 204 may implement a Rectified Non-Linear unit (ReLU) layer. Storage units 217 may store data for implementing a neural-network based model. Such data may include, training data, inference data, connectivity descriptors (e.g., adjacency list), network parameters (e.g., eights, activation function) or other data needed to configure a neural network.

The distributed GPU drive 200 may implement a data-parallel distributed stochastic gradient descent (SGD). For example, each processing node 204 stores a local replica of a neural network and computes sub-gradients based on different partitions of the training data. The sub-gradients may form the basis of updates to weights of the neural network and the weight-updates must be synchronized across the processing nodes 204.

A neural network implemented by the distributed GPU drive 200 may be designed for detecting: image features in image data, motion features in video streams, text patterns in textual data, statistical features in multi-dimensional complex data, scientific features in scientific processes and simulations, astronomical features in astronomical data coming from the space, weather conditions in world weather data as well as predictions based on them, words in voice audio data. The neural network may be used to detect features or characteristics in computer generated graphics, virtual reality data, and augmented reality data. Features may be detected for satellite imagery, long exposure generated graphics, time-lapse videos, slow-motion videos. The neural network may be configured to perform feature detection on graphical or visual representation of data collected from a variety of sources such as data repositories or databases. The data subject to feature detection may be data that is structured, data that is semi-structured, data that is unstructured, data objects generated from machines, data logs, real-time data generated from a remote source, data that is aggregated from a plurality of sources, data received over a network, data that has been pre-processed by host systems, data that has been subject to visual filters, or data that generated at least partially by an external computing system. Features that searched for within the data include visual patterns, horizontal lines, edges, vertical lines, various shapes, curves, angles, particular colors, orientations. In addition, simple features may be combined to formulate more complex features such as complex objects.

In some embodiments, the distributed GPU drive 200 is configured for implementing artificial intelligence algorithms adapted for operating vehicles (e.g., smart cars). Image and sensory data may be collected from automobile systems. This may include video feeds, proximity sensor data, RADAR data, LiDAR data, and other image and sensory data. The image and sensory data may be streamed from a host system to the RAM units 225 and/or storage units 217 via coherent fabric or the interface controller. The GPU nodes 207 may execute programs (e.g., deep learning algorithms) to analyze the data streamed into the processing nodes 204 and generate output data that is communicated back to the host system.

In some embodiments, a neural network executed by the distributed GPU drive 200 may perform unstructured learning where image and sensory data is continuously received in various vehicle operating situations. The neural network may learn from how the vehicle is operated in response to the image and sensory data. For example, inputs related to steering, braking, and accelerating received from the user may be streamed in conjunction with image and sensory data. The neural network may learn and generate inferences based on how the driver is operating the vehicle under different driving conditions that are characterized by the image and sensory data. As additional image and sensory data is received, the neural network may determine how the vehicle should be steered, accelerated/decelerated, or otherwise controlled. The processing nodes 204 may generate output data for an autonomous driving system to operate the vehicle in accordance with the output data.

Figure 5:
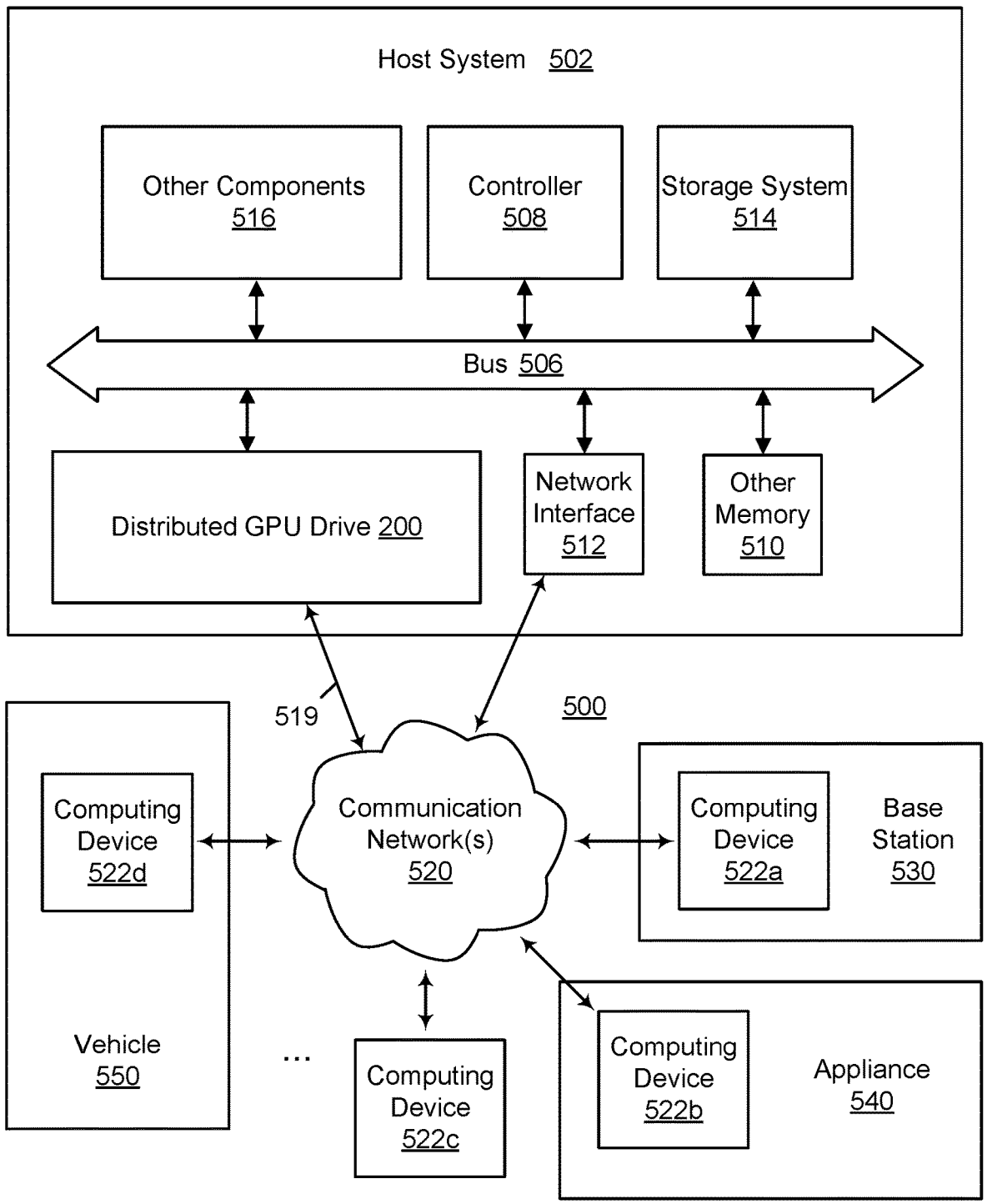
FIG. 5 illustrates an example of a networked system 500 that includes a distributed GPU drive 200, in accordance with embodiments of the present disclosure.

FIG. 5 illustrates an example networked system 500 that includes a distributed GPU drive 200, in accordance with some embodiments of the present disclosure. FIG. 5 illustrates example parts of an example of a host system 502 (e.g., a computing device) which is part of the networked system 500. FIG. 5 shows how such computing devices can be integrated into various machines, apparatuses, and systems, such as IoT (Internet of Things) devices, mobile devices, communication network devices and apparatuses (e.g., see base station 530), appliances (e.g., see appliance 540), and vehicles (e.g., see vehicle 550).

The host system 502 and/or other systems of the networked system 500 (e.g., see computing devices 522a, 522b, 522c, and 522d) can be communicatively coupled to one or more communication networks 520. The host system 502 includes, for example, a bus 506, a controller 508 (e.g., a CPU), other memory 510, a network interface 512, a storage system 514, other components 516 (e.g., any type of components found in mobile or computing devices, GPS components, Input/Output (I/O) components such various types of user interface components, sensors, a camera, etc.), and a distributed GPU drive 200. The other components 516 may also include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 506 communicatively couples the controller 508, the other memory 510, the network interface 512, the data storage system 514 and the other components 516, and can couple such components to the distributed GPU drive 200 in some embodiments. For example, an interface controller 233 of the distributed GPU drive 200 may couple to the bus 506. Alternatively, the bus 506 may be implemented as coherent fabric that extends into the distributed GPU drive 200 and couples directly with components of the host system 502.

The host system 502 includes a computer system that includes controller 508, other memory 510 (e.g., random access memory (RAM), read-only memory (ROM), flash memory, dynamic random-access memory (DRAM) such as synchronous DRAM (SDRAM) or Rambus DRAM (RDRAM), static random-access memory (SRAM), cross-point or cross-bar memory, etc.), the GPU drive 200, and data storage system 514, which may communicate with each other via bus 506 (which can include multiple buses). In some embodiments, distributed GPU drive 200 may not communicate over bus 506.

To put it another way, FIG. 5 includes a block diagram of a host system 502 that has a computer system in which embodiments of the present disclosure can operate. In some embodiments, the host system can include a set of instructions, for causing a machine to perform at least part any one or more of the methodologies discussed herein, when executed. In such embodiments, the machine can be connected (e.g., networked via network interface 512) to other machines in a Local Area Network (LAN), an intranet, an extranet, and/or the Internet (e.g., see communication network(s) 520). The machine can operate in the capacity of a server or a client machine in client-server network environment, as a peer machine in a peer-to-peer (or distributed) network environment, or as a server or a client machine in a cloud computing infrastructure or environment.

Controller 508 represents one or more processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 508 can also be one or more special-purpose processing devices such as an ASIC, a programmable logic such as an FPGA, a digital signal processor (DSP), network processor, or the like. Controller 508 is configured to execute instructions for performing the operations and steps discussed herein. Controller 508 can further include a network interface device such as network interface 512 to communicate over one or more communication networks (such as network(s) 520).

The data storage system 514 can include a machine-readable storage medium (also known as a computer-readable medium) on which is stored one or more sets of instructions or software embodying any one or more of the methodologies or functions described herein. The data storage system 514 can have execution capabilities such as it can at least partly execute instructions residing in the data storage system. The instructions can also reside, completely or at least partially, within at least one of the other memory 510 and the distributed GPU drive 200 and/or within the controller 508 during execution thereof by the host system. The other memory 510 can be or include main memory or system memory of the host system 502. The other memory 510 and the distributed GPU drive 200 can have execution capabilities such as it can at least partly execute instructions residing in any memory of the host system 502.

As mentioned, the networked system 500 includes computing devices, and each of the computing devices can include one or more buses, a controller, a memory, a network interface, a storage system, and other components. Also, each of the computing devices shown in FIG. 5 and described herein can include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to communication network(s) 520 that includes at least a local to device network such as Bluetooth or the like, a wide area network (WAN), a local area network (LAN), an intranet, a mobile wireless network such as 4G or 5G, an extranet, the Internet, and/or any combination thereof. In some embodiments, as shown with the connection 519, the distributed GPU drive 200 can include at least one network interface so that it can communicate separately with other devices via communication network(s) 520. For example, the interface controller 233 may couple to the communication network 520. In this respect, a memory module or a memory module system of the distributed GPU drive 200 may have its own network interface so that such a component can communicate separately with other devices via communication network(s) 520.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the host system 502 shown in FIG. 5, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system comprising:
   an array of processing nodes, each processing node comprising:
   a vector-scalar processor (VSP), wherein the VSP can be re-configured to perform vector processing or scalar processing, the VSP comprising onboard memory via a vector arithmetic-logic unit (ALU) and a set of registers, wherein the vector ALU and the set of registers can be re-allocated when the vector ALU and set of registers are re-configured to operate on one of scalar or vector data inputs, wherein the vector ALU is re-configured by re-configuring the vector ALU into a combination of scalar processing elements and multiple vector processing elements, each size of the multiple vector processing elements smaller than a size of the scalar processing elements, a Random Access Memory (RAM) unit coupled to the VSP, and a non-volatile storage unit coupled to one of the VSP or the RAM unit; and a driver comprising code to control the array of processing nodes to perform an operation by re-configuring the vector ALU to operate on one of scalar or vector data inputs and distributing an execution of the operation across at least a portion of the array of processing nodes.

2. The system of claim 1, further comprising coherent fabric coupled to each processing node, the coherent fabric being configured to exchange data between each processing node to synchronize the execution of the operation.

3. The system of claim 2, wherein the coherent fabric is configured to couple to a host processor.

4. The system of claim 1, wherein the array of processing nodes is embedded on a graphics card configured to couple to a host system.

5. The system of claim 1, wherein the RAM unit comprises Dynamic RAM (DRAM), and wherein the storage unit comprises a NAND- or NOR-based Flash memory or 3D Cross Point memory.

6. The system of claim 1, wherein the VSP is configured to buffer data by loading the data into the RAM unit and to store the buffered data in the storage unit.

7. The system of claim 1, wherein the VSP is configured to load index data of a data block in the RAM unit and store the data block in the storage unit.

8. The system of claim 7, wherein the array of processing nodes is configured to perform an in-drive database operation by accessing the data block using the index data.

9. The system of claim 1, wherein the operation comprises at least one of a memory allocation (malloc), a memory mapping (mmap) function, or a memory free function, wherein the operation originates at a host operating system.

10. The system of claim 9, wherein the storage unit is configured to provide access to a user while bypassing the host operating system.

11. The system of claim 1, wherein the onboard memory is configured to buffer a data block received from the storage unit, the VSP configured to perform byte-addressed operations on the data block.

12. The system of claim 1, wherein the VSP is configured to execute at least partly an operating system that supports a user application.

13. The system of claim 1, wherein the VSP is configured to implement at least a portion of a neural network.

14. The system of claim 1, wherein, the RAM unit is coupled to the VSP via a first bus, and wherein the storage unit is coupled to one of the VSP or the RAM unit via a second bus.

15. The system of claim 1, wherein the RAM unit and the storage unit are integrated into a single unit.

16. A system comprising:

coherent fiber coupled to a plurality of Vector-Scalar Processors (VSPs), each VSP comprising onboard cache; and each VSP being configured to:

perform both vector processing and scalar processing via a vector arithmetic-logic unit (ALU) and a set of registers, wherein the vector ALU and the set of registers can be re-allocated when the vector ALU and set of registers are re-configured to operate on one of scalar or vector data inputs, re-configuring the vector ALU into a combination of scalar processing elements and multiple vector processing elements, each size of the multiple vector processing elements smaller than a size of the scalar processing elements;

couple to a respective Dynamic Random Access Memory (DRAM) unit;

couple to a respective non-volatile storage unit; and transfer data from the DRAM unit to the storage unit, wherein the plurality of VSPs implement a file system.

17. The system of claim 16, further comprising a Graphics Processor Unit (GPU) card configured to couple to a host system.

18. The system of claim 16, wherein each VSP is configured to load index data of a data block in the DRAM unit and store the data block in the storage unit.

19. The system of claim 16, wherein the plurality of VSPs are configured to perform a function originating at a host operating system, the function comprising at least one of an mmap function, a memory allocation (malloc), or a memory free function.

20. The system of claim 16, wherein the onboard cache is configured to buffer a data block received from the storage unit, the VSP configured to byte-address the data block.

21. The system of claim 16, further comprising a driver configured to control the plurality of VSPs to perform a file system operation.

22. The system of claim 16, further comprising a Solid-State Drive Unit (SSD) configured to couple to a host system.

23. A method comprising:

receiving data from a host system;

buffering the received data into memory;

performing, by a plurality of Graphics Processor Unit (GPU) nodes, at least one operation on the buffered data to provide processed data, wherein each of the GPU nodes comprises a vector-scalar processor (VSP) re-configurable to perform vector processing or scalar processing via a vector arithmetic-logic unit (ALU) and a set of registers, wherein the vector ALU and the set of registers can be re-allocated when the vector ALU and set of registers are re-configured to operate on one of scalar or vector data inputs, re-configuring the vector ALU into a combination of scalar processing elements and multiple vector processing elements, each size of the multiple vector processing elements smaller than a size of the scalar processing elements; and storing the processed data.

24. The method of claim 23, wherein the data processed by each GPU node is stored in a Random Access Memory (RAM) unit or a storage unit.

25. The method of claim 23, further comprising receiving, from the host system, instructions specifying the at least one operation to perform.

26. The method of claim 23, wherein the host system is coupled to a distributed Graphics Processor Unit (GPU) drive that includes the GPU nodes.

27. The method of claim 26, wherein the distributed GPU drive identifies at least one processing node to store the received data.

28. The method of claim 26, wherein the distributed GPU drive receives a message from the host system to process data stored in the distributed GPU drive.

29. The method of claim 26, wherein the received data is stored as data blocks within one or more memory components of the distributed GPU drive.

30. The method of claim 23, wherein the data is stored as each of the GPU nodes processes the buffered data.

31. The method of claim 23, wherein each of the GPU nodes comprises a vector-scalar processor (VSP) configured to perform vector processing and configured to perform scalar processing.

* * * * *